United States Patent
McCullough et al.

(10) Patent No.: US 8,414,455 B2
(45) Date of Patent: Apr. 9, 2013

(54) VEHICLE SYSTEMS AND METHODS OF OPERATING VEHICLE SYSTEMS

(75) Inventors: Scott A. McCullough, Sterling Heights, MI (US); Ingobert K. Lassrich, Trebur (DE); David T. Proefke, Madison Heights, MI (US); Fred W. Huntzicker, Ann Arbor, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 1041 days.

(21) Appl. No.: 12/418,251

(22) Filed: Apr. 3, 2009

(65) Prior Publication Data
US 2010/0255953 A1 Oct. 7, 2010

(51) Int. Cl.
*F16H 59/74* (2006.01)
(52) U.S. Cl. .......................... 477/99; 477/106
(58) Field of Classification Search .............. 477/97, 477/99, 101, 106, 107, 110, 111, 114, 183, 477/203
See application file for complete search history.

(56) References Cited

U.S. PATENT DOCUMENTS

| | | | | |
|---|---|---|---|---|
| 5,736,935 A * | 4/1998 | Lambropoulos | ......... | 340/426.16 |
| 6,500,092 B2 * | 12/2002 | Syamoto | .......................... | 477/99 |
| 7,104,923 B2 * | 9/2006 | Nakane et al. | ................... | 477/99 |
| 7,161,262 B2 * | 1/2007 | Nagae et al. | ................. | 307/10.4 |
| 2005/0288151 A1 * | 12/2005 | Yamamoto | ..................... | 477/110 |
| 2007/0135262 A1 * | 6/2007 | Cho | .............................. | 477/107 |

* cited by examiner

*Primary Examiner* — Justin Holmes
(74) *Attorney, Agent, or Firm* — Ingrassia Fisher & Lorenz, P.C.

(57) ABSTRACT

A vehicle system includes a transmission shifting means, an authorization means, an engine, and a control system. The transmission shifting means is capable of being shifted between a first position and a second position, where the first position represents a start mode. The authorization means adapted to detect an identification signal and to supply an authorization signal indicating the identification signal has been verified. The engine is adapted to turn on and to turn off. The control system is in operable communication with the transmission shifting means, the authorization means, and the engine. When the transmission shifting means is shifted to the first position, the transmission shifting means sends a first signal to the control system, the control system detects whether the authorization signal has been received from the authorization means, and if received, the control system provides a first command to the engine to turn on.

11 Claims, 3 Drawing Sheets

VEHICLE SYSTEMS AND METHODS OF OPERATING VEHICLE SYSTEMS

TECHNICAL FIELD

The inventive subject matter generally relates to vehicles, and more particularly relates to vehicle systems and methods of operating vehicle systems including keyless starting systems.

BACKGROUND

In recent years, advances in technology, as well as ever evolving tastes in style, have led to substantial changes in the design of automobiles. One of the changes involves the complexity of, and convenience offered by, the systems used to gain entry into and start automobiles. One recent modernization of ignition systems is the advent of "keyless" systems with "push-button" starting. Such systems use electronic keys that do not have to be inserted into the ignition switch of the automobile but that instead merely need to be present in a predetermined authorization zone, such as the driver compartment of the automobile, to enable the automobile to be started. When the automobile detects that an authorized electronic key is within the authorization zone, the driver may start the automobile by simply pressing a start button on the vehicle's dashboard, for example. If the automobile does not detect an authorized key within the authorization zone, the automobile disables the starting system so that the automobile can not be started.

Although current keyless starting systems suitably start automobile engines, they may be improved. For instance, keyless starting systems may include many additional components that may be added to a conventional automobile. Thus, the keyless starting systems may increase the manufacturing costs and complexity of the automobile. Additionally, start/stop buttons, which are typically employed with keyless starting systems, may deter some drivers from considering vehicle purchase because of the lack of familiarity with starting an automobile with the push of a button, as opposed to the conventional turn of a key.

Accordingly, it is desirable to provide a method and system for controlling the operational state of an automobile that may be more convenient and/or familiar and/or easier to understand to a driver. It is also desirable to provide a keyless starting system that may be installed relatively easily and inexpensively as optional equipment on an automobile. Furthermore, other desirable features and characteristics of the inventive subject matter will become apparent from the subsequent detailed description and the appended claims, taken in conjunction with the accompanying drawings and the foregoing technical field and background.

SUMMARY

Vehicle systems and methods of operating vehicle systems are provided.

In an embodiment, by way of example only, a vehicle system includes a transmission shifting means, an authorization means, an engine, and a control system. The transmission shifting means is capable of being shifted between a first position and a second position, where the first position represents a start mode. The authorization means adapted to detect an identification signal and to supply an authorization signal indicating the identification signal has been verified. The engine is adapted to turn on and to turn off. The control system is in operable communication with the transmission shifting means, the authorization means, and the engine. When the transmission shifting means is shifted to the first position, the transmission shifting means sends a first signal to the control system, the control system detects whether the authorization signal has been received from the authorization means, and if received, the control system provides a first command to the engine to turn on.

In another embodiment, by way of example only, a vehicle system includes a transmission shifting means, an authorization means, a steering system, an engine, and a control system. The transmission shifting means is capable of being shifted between a first position and a second position, where the first position represents a start mode. The authorization means is adapted to detect an identification signal and to supply an authorization signal indicating the identification signal has been verified. The steering system may include a locking mechanism and is in communication with the control system and is capable of providing a signal to the control system indicating whether the locking mechanism is locked or unlocked. The engine is adapted to turn on and to turn off. The control system is in operable communication with the transmission shifting means, the authorization means, the steering system, and the engine. When the transmission shifting means is shifted to the first position, the transmission shifting means sends a first signal to the control system, the control system detects whether the authorization signal has been received from the authorization means and whether the signal from the steering mechanism has been received that the locking mechanism is unlocked and if received, the control system provides a first command to the engine to turn on.

In another embodiment, by way of example only, a method includes detecting an authorization signal from an authorization means, if the authorization signal is detected, receiving a first signal from a transmission shifting means indicating a shift of the transmission shifting means from a first position to a second position, and providing a first command to an engine to turn on.

DETAILED DESCRIPTION

The inventive subject matter will hereinafter be described in conjunction with the following drawing figures, wherein like numerals denote like elements, and FIG. 1 is a schematic view of an automobile, according to an embodiment;

DETAILED DESCRIPTION

The following detailed description is merely exemplary in nature and is not intended to limit the inventive subject matter or the application and uses of the inventive subject matter. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-4 are merely illustrative and may not be drawn to scale.

Figure 1:
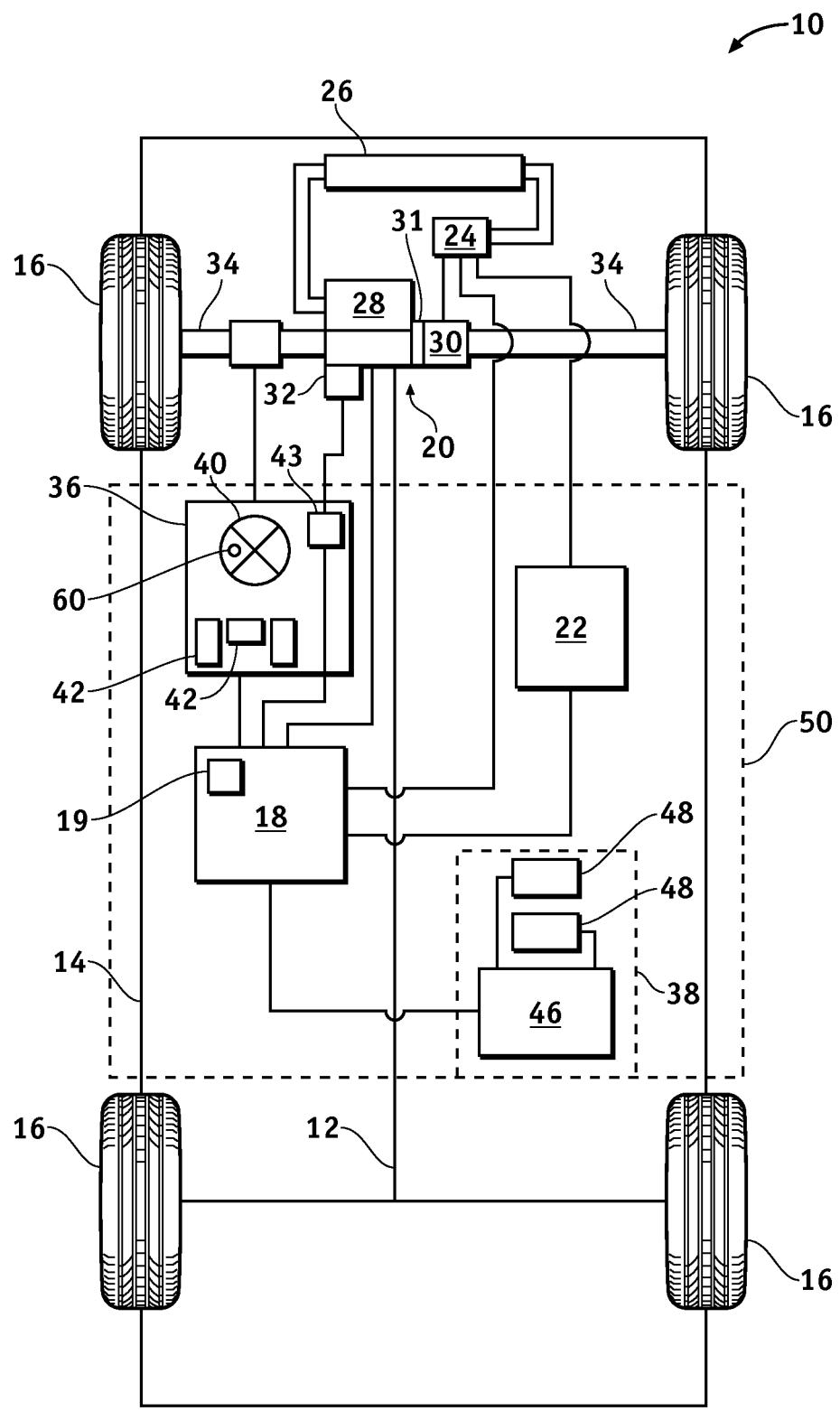

FIG. 1 illustrates a vehicle 10, or "automobile," according to one embodiment of the inventive subject matter. In an embodiment, the vehicle 10 is configured to include a keyless starting system that employs a transmission shifter means of a vehicle that may be shifted from a "park" position or another position, which may be a separate "ON" position or a first gear, second gear, and so on, to thereby start the vehicle. Because drivers are typically already use transmission shifter means while driving, such an interface may provide a comfort and/or familiarity to drivers who are averse to push button type of starter.

In any case, the vehicle 10 includes a chassis 12, a body 14, four wheels 16, and an electronic control system 18, in an embodiment. The body 14 is arranged on the chassis 12 and substantially encloses the other components of the vehicle 10. The body 14 and the chassis 12 may jointly form a frame. The wheels 16 are each rotationally coupled to the chassis 12 near a respective corner of the body 14.

The vehicle 10 may be any one of a number of different types of vehicles, such as, for example, a sedan, a wagon, a truck, a sport utility vehicle (SUV), a non-commercial vehicle, a commercial vehicle, or a bus, and may be two-wheel drive (2WD) (e.g., rear-wheel drive or front-wheel drive), four-wheel drive (4WD) or all-wheel drive (AWD), or military type vehicles, such as but not limited to, jeeps, and armored and non armored transport vehicles. The vehicle 10 may also incorporate any one of, or combination of, a number of different types of engines, such as, for example, a gasoline or diesel fueled combustion engine, a "flex fuel vehicle" (FFV) engine (e.g., using a mixture of gasoline and alcohol), a gaseous compound (e.g., hydrogen and/or natural gas) fueled engine, a combustion/electric motor hybrid engine, and an electric motor.

In an embodiment, the vehicle 10 is a hybrid vehicle, and further includes an actuator assembly 20, a battery 22, a power inverter assembly (or inverter) 24, and a radiator 26. The actuator assembly 20 includes a combustion engine 28, an electric motor/generator (or motor) 30, and a starter 32 coupled to the combustion engine 28. The electric motor 30 includes a transmission 31 therein, and although not illustrated, also includes a stator assembly (including conductive coils), a rotor assembly (including a ferromagnetic core), and a cooling fluid (e.g., coolant). The stator assembly and/or the rotor assembly within the electric motor 30 may include multiple electromagnetic poles (e.g., sixteen poles), as is commonly understood.

Still referring to FIG. 1, in an embodiment, the combustion engine 28 and the electric motor 30 are integrated such that both may be, but are not required to be, mechanically coupled to at least some of the wheels 16 through one or more drive shafts 34. The radiator 26 is connected to the frame at an outer portion thereof and although not illustrated in detail, includes multiple cooling channels therethrough that contain a cooling fluid (e.g., coolant) such as water and/or ethylene glycol (e.g., antifreeze) and is coupled to the engine 28 and the inverter 24. In the depicted embodiment, the inverter 24 receives and shares coolant with the electric motor 30. The radiator 26 may be similarly connected to the inverter 24 and/or the electric motor 30.

The electronic control system 18 is in operable communication with the actuator assembly 20 (which includes the engine 28 and motor 30), the battery 22, and the inverter 24. Although not shown in detail, the electronic control system 18 includes various sensors and automotive control modules, or electronic control units (ECUs), such as an inverter control module and a vehicle controller, and at least one processor and/or a memory which includes instructions stored thereon for carrying out the processes and methods as described below. In the depicted embodiment, the electronic control system 18 also includes a warning device 19, which may be, for example, an audio speaker, a light emitting diode (LED), and/or a display device.

The vehicle 10 also includes an automotive control subsystem 36 and a keyless start subsystem 38. The automotive control subsystem 36 is in operable communication with the electronic control system 18 and includes a steering system (e.g., steering wheel) 40, a braking system 42, and a transmission shifter means 43. The steering system 40 may include a locking mechanism 60 that is adapted to lock and unlock a steering column (not shown) to allow an operator to operate (e.g., rotate) the steering column. The steering system 40 may be adapted to provide a signal to the electronic control system 18 indicating whether the locking mechanism 60 is engaged or disengaged (e.g., in a locked or unlocked state). Although not specifically shown, the steering system 40 is configured to include various electronics and devices that are associated with conventional vehicle steering systems.

The braking system 42 includes a brake pedal and is adapted to be actuated (e.g., depressed) by the user and to transmit signals to the electronic control system 18 indicating the user's desire to decrease the rotational speed of the wheels 16. Although not specifically shown, the braking system 42 is configured to include various electronics and devices that are associated with conventional vehicle braking systems.

The transmission shifter means 43 is moveable between various positions to set the transmission 31 into various modes and/or gears. For example, the transmission 31 may be shifted between various drive gears (e.g., drive, first gear, second gear, third gear, or reverse) and non-drive gears (e.g., park or neutral). In an embodiment, the transmission shifter means 43 is adapted to provide means for initiating an engine starting sequence, and thus may be capable of shifting between positions indicating an engine start mode and an engine stop mode.

The keyless start subsystem 38 serves as an authorization means and is in operable communication with the electronic control system 18. In an embodiment, the keyless start subsystem 38 is adapted to detect an identification signal and to supply an authorization signal to the electronic control system 18 indicating the identification signal has been verified. In this regard, according to an embodiment, the keyless start subsystem 38 may include a keyless start control module 46 and at least one antenna 48. In one embodiment, the keyless start subsystem 38 includes two antennae 48 (e.g., a low frequency antenna and a high frequency antenna). Although not shown, the keyless start control module 46 may include a Radio Frequency Identification (RFID) reader and/or a radio frequency (RF) receiver, as is commonly understood. The keyless start subsystem 38, and in particular the range of the antennae 48, may define a keyless entry authorization zone (or simply "authorization zone") 50 for the vehicle 10. As shown in the embodiment depicted in FIG. 1, the authorization zone 50 may completely or substantially be within the body 14 (or a passenger compartment) of the vehicle 10. However, in another embodiment, the authorization zone 50 may extend to an area outside of the body 14 of the vehicle 10.

Figure 2:
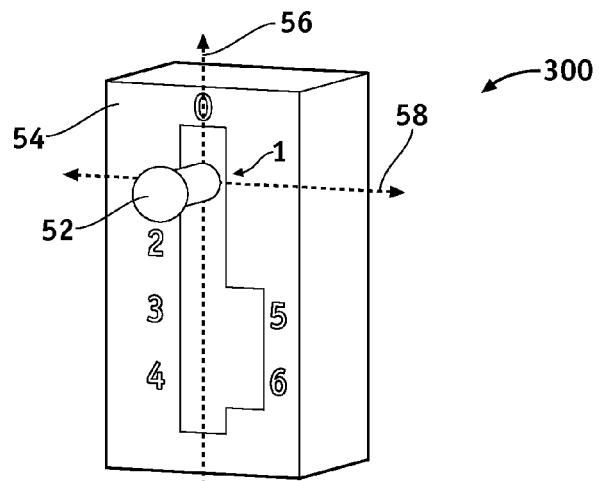
FIG. 2 is a perspective view of a transmission shifting means within the automobile of FIG. 1, according to an embodiment.

FIG. 2 illustrates the transmission shifter means 200 in greater detail. As shown, the transmission shifter means 200 includes a shifter 52 and a housing 54. In an embodiment, the shifter 52 includes a handle that is configured to be moved by a driver between several positions. The positions are, for illustrative purposes, indicated by "0," "1," "2," "3", "4", "5", and "6". However, it will be appreciated that the positions may not be limited by such labeling in other embodiments. For example, in some embodiments, some of the positions may be labeled with symbols or letters, such as "D", "R", and the like. Moreover, a position referred to herein as a "first position" may refer to any one of positions "0," "1," "2," "3", "4", "5", "6" or other positions, while a position referred to herein as a "second position" indicates that the shifter 52 has moved to another position, which may refer to any one of positions "0," "1," "2," "3", "4", "5", and "6" that was not employed for the first position.

According to an embodiment, the positions "0," "1," "2," "3", "4", "5", and "6" may be disposed along a first axis 56, according to an embodiment. For example, the 0 position may be disposed at a first axial location along the first axis 56 and the "1", "2", "3", and "4" positions may be disposed at other axial locations along the first axis 56. In other embodiments, some of the positions may be disposed along other axes. In an example, the "0" position may be disposed at a first location along a second axis 58, the "1" position may be disposed at a second location at an intersection of the second axis 58 and the first axis 56, and the "2", "3" and "4" positions may be disposed at other locations along the first axis 56. Though not indicated, in such an embodiment, the "0" position may be located along the second axis 58 on either side of the "1" position. In another embodiment, the positions may form a curve or another pattern of movement to the operating positions "0", "1," "2," "3", "4", "5", and "6".

Figure 3:
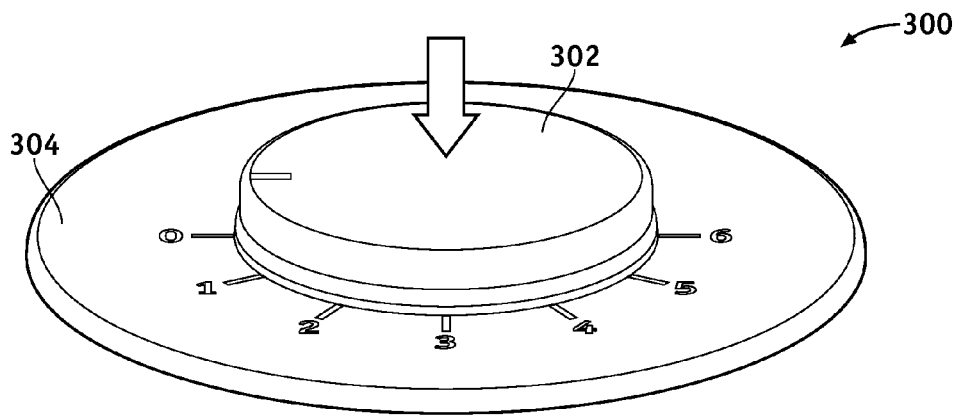
FIG. 3 is a perspective view of a transmission shifting means within the automobile of FIG. 1, according to another embodiment.

FIG. 3 illustrates a transmission shifter means 300, according to another embodiment. Here, the positions "0," "1," "2," "3", "4", "5", and "6" may be disposed in a rotary fashion, and the transmission shifter means 300 includes a shifter 302 and a housing 304. In an embodiment, the shifter 302 includes a knob that is configured to be rotated by the driver between the positions. The positions may be disposed at different radial locations along a curve indicated by dotted line 306, according to an embodiment. In still other embodiments, the positions may be disposed in different planes. For example, the "0" position may be disposed in a first horizontal plane, while one or more of the other positions (e.g., positions "1", "2," "3", "4", "5" or "6") may be located in a second plane that is above or below the first horizontal plane. In such an embodiment, the handle or knob may be configured to be pushed and/or twisted by the driver in order to change positions.

Each of the positions shown in FIGS. 2 and 3 corresponds to an operational state of the vehicle 10, as controlled with the transmission shifter means 200, 300 through the electronic control system 18 (FIG. 1). In an embodiment, the "0" position may include a STOP mode in which the electrical system and engine are turned OFF. Thus, in an embodiment, if the transmission shifter means 200, 300 is moved to the "0" position, a signal is provided to the electronic control system 18 to initiate an operational sequence for turning the electrical system and engine OFF. In another embodiment, the "0" position may have a dual function. For example, the "0" position may also include a START mode in which the electrical system and engine may be turned ON. Accordingly, in an embodiment, if the engine is OFF and the transmission shifter means 200, 300 is moved to the "0" position, a signal is provided to the electronic control system 18 to initiate an operational sequence for engine ignition to thereby turn the engine ON. In still another embodiment, the "0" position also may include a "park" feature in which the vehicle is parked and wheels of the vehicle are not rotating, while the electronic control system 18 initiates operational sequences to turn the engine ON or OFF.

According to an embodiment, the "1" position may be configured to serve a single function and may include a "park" feature. In another embodiment, the "1" position may serve a dual function and may include the "park" feature and either the stop or start mode to thereby allow the electrical system and the engine to be started (e.g., turned ON) or stopped (e.g., turned OFF). In another embodiment, positions "2" through "6" may indicate electrical system and engine ON positions that allow the electrical system to remain in an ON mode and to allow the engine to shift gears during vehicle operation. Although, not specifically shown, a housing/locking mechanism may be included, which may comprise, for example, an electric motor, solenoid, and/or other suitable device, to lock the transmission shifter means 200, 300 to prevent it from shifting undesirably within the housing 54.

Figure 4:
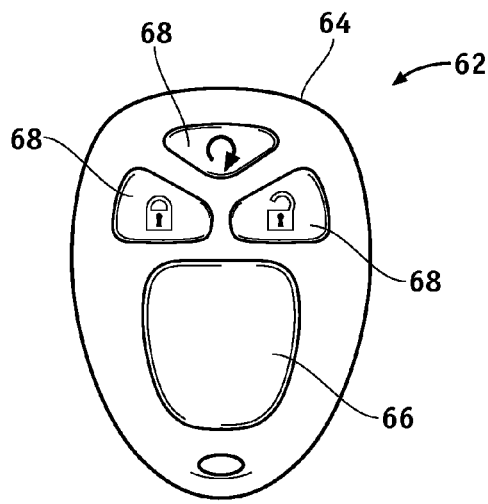
FIG. 4 is a plan view of a keychain fob, according to an embodiment.

FIG. 4 illustrates a keychain fob, or simply "fob," (or electronic device) 62, which is adapted to wirelessly communicate with an authorization means (e.g., keyless start subsystem 38). In the depicted embodiment, the fob 62 includes a housing 64 with a display screen 66 and multiple buttons 68 thereon, such as a door-lock button, a door-unlock button, and a "panic" button. Although not shown, the fob 62 also includes a RFID chip and/or transmitter within the housing 64, which is adapted to transmit an identification signal to the authorization means.

During operation, the fob 62 shown in FIG. 4 is used by a user (e.g., driver) to gain entry into the vehicle 10 (FIG. 1) by, for example, unlocking the doors and/or trunk of the vehicle 10 with one of the buttons 68 on the fob 62, or by passive entry mechanisms, as are commonly understood. Upon entering a passenger compartment of the vehicle 10, the driver will bring the fob 62 with him or her (e.g., in a pocket of an article of clothing or in a purse) into the authorization zone 50 shown in FIG. 1.

Figure 5:
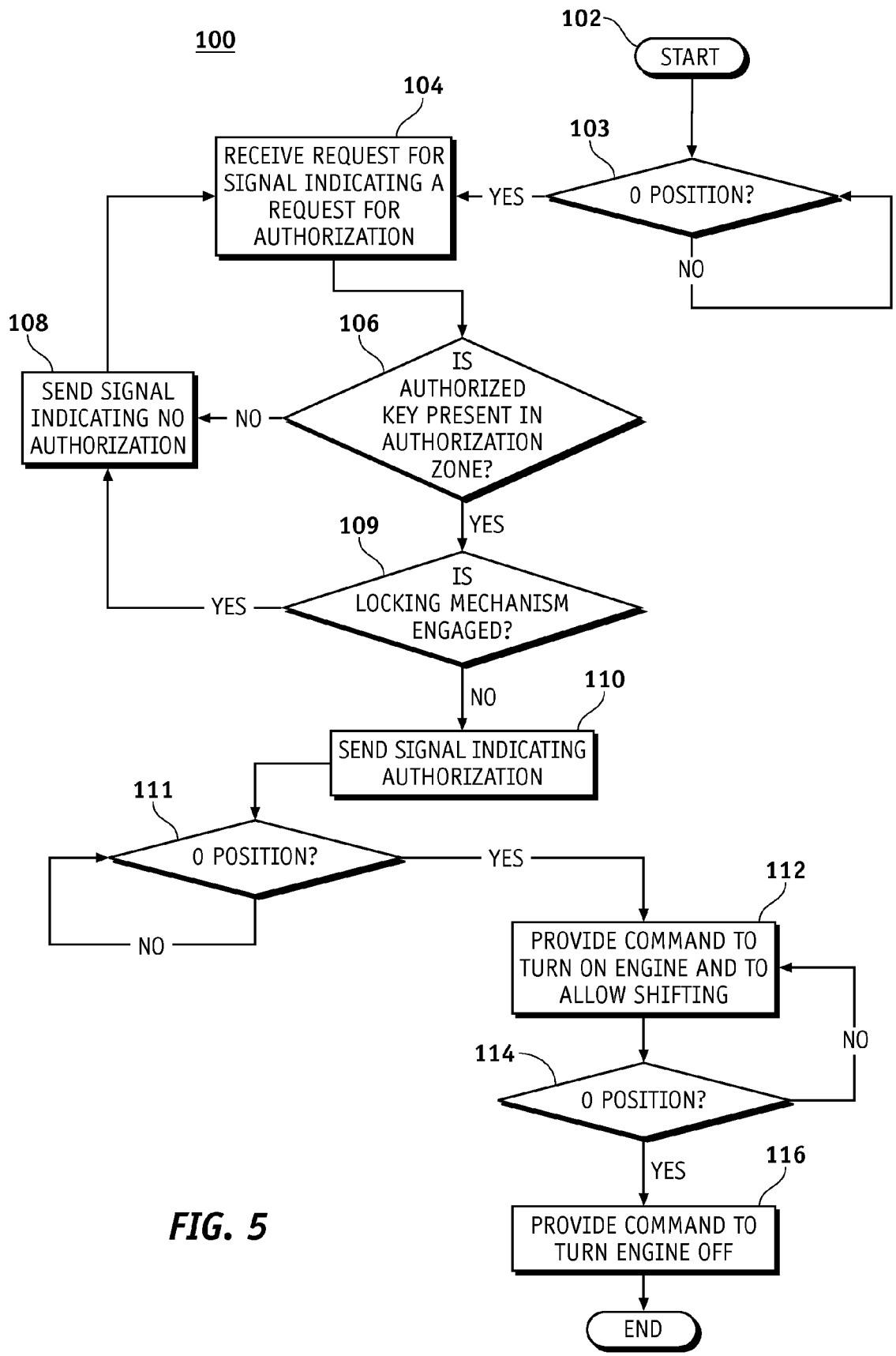
FIG. 5 is a flow diagram illustrating a method for operating the automobile of FIG. 1, according to an embodiment.

FIG. 5 illustrates a method 100 for controlling an operational state of the vehicle 10, according to one embodiment of the inventive subject matter. Although the method 100 may be described below as being carried out and/or processed by the electronic control system 18 (FIG. 1) and/or the keyless start subsystem 38 (FIG. 1), the particular steps described below may be performed by various components within the electronic control system 18 and the keyless start subsystem 38.

In an embodiment, the method 100 begins as block 102 when the driver enters the vehicle 10. According to an embodiment, the method 100 starts when the driver shifts the transmission shifter means 43, 200, 300 to an ON position. In an embodiment, a determination may be made whether the shifting means has been shifted to the "0" position, block 103. If not, the method 100 may iterate as shown. If so, the transmission shifter means 43, 200, 300 transmits a signal to the electronic control system 18 that a request for authorization has been made, and the method 100 may continue to block 104. In another embodiment, the driver may depress (or apply a force onto) the brake pedal. In such case, the braking system 42 transmits a signal to the electronic control system 18 that a request for authorization has been made.

In one embodiment, the electronic control system 18, at block 104, receives a signal that indicates that the action associated with requesting authorization has taken place. At block 106, the electronic control system 18 detects whether an authorization signal has been received from an authorization means (e.g., keyless start subsystem 38). For example, the electronic control system 18 may detect whether the keyless start subsystem 38 has determined if an authorized electronic key (e.g., the fob 62) is within the authorization zone 50 shown in FIG. 1. As is commonly understood, the RFID chip or transmitter circuit within the fob 62 transmits an identification signal which is received by the antennas 48 (FIG. 1) and sent to the keyless start control module 46. The fob 62 and the keyless start control module 46 communicate via encrypted challenge and response data exchanges to verify that an authorized electronic key is present in the vehicle authorization zone. When an authorized key is present, the keyless start subsystem 38 sends an authorization signal to the electronic control system 18. In another embodiment, this authorization may be granted by the electronic control system 18 determining that access to the vehicle 10 was granted using an authorized electronic device (e.g., the fob 62).

If the keyless start control module 46 does not recognize the identification signal from the fob 62 as one corresponding to an authorization key that has been given access to the particular vehicle 10, then in block 108, the keyless start control module 46 sends a signal to the electronic control system 18 indicating that operation of the transmission shifter means 43, 200, 300 is not authorized (or simply no signal is sent to the electronic control system 18). As such, operation of the transmission shifter means 43, 200, 300 is prevented and the engine remains OFF. The method 100 then returns to block 104 and awaits another indication of a request for authorization.

At block 106, when the keyless start control module 46 determines that an authorized key is present in the authorization zone, then in block 109 the electronic control system 18 may additionally or alternatively determine if the locking mechanism 54 is engaged (e.g., the steering system 40 is locked), step 109. If the locking mechanism 54 is engaged, then in block 108, the keyless start control module 46 detects a signals from the steering system 40 and sends a signal to the electronic control system 18 indicating that operation of the transmission shifter means 43, 200, 300 has not been authorized, and the method 100 then returns to block 104 and awaits another indication of a request for authorization. If the locking mechanism 54 is not engaged, then the keyless start control module 46 sends a signal to the electronic control system 18 indicating that operation of the transmission shifter means 43, 200, 300 has been authorized, in block 110. The method then continues to block 111.

In block 111, a determination is made whether the transmission shifting means has been shifted to the "0" position. If not, the method iterates as shown. If so, then the transmission shifting means 43, 200, 300 sends a signal to the electronic control system 18 in block 112, which provides a command to the engine to start the engine. In block 114, a determination is made whether the transmission shifting means has been shifted to the "0" position. If not, the method iterates as shown. If so, then the transmission shifting means 43, 200, 300 sends a signal to the electronic control system 18 in block 116, which provides a command to the engine to stop, and the engine is shut OFF. The method then ends.

Hence, systems and methods have now been described that includes a keyless starting system that allows the driver to initiate engine with a familiar shifting action as opposed to a start button. Additionally, the shifting configuration may only be established when an authorized key is present within the authorization zone. Moreover, the systems may be implemented into vehicles in a manner that may be more cost effective than other conventional keyless ignition systems.

While at least one embodiment has been presented in the foregoing detailed description, it should be appreciated that a vast number of variations exist. It should also be appreciated that the embodiment or embodiments are only examples, and are not intended to limit the scope, applicability, or configuration of the invention in any way. Rather, the foregoing detailed description will provide those skilled in the art with a convenient road map for implementing the embodiment or embodiments. It should be understood that various changes can be made in the function and arrangement of elements without departing from the scope of the invention as set forth in the appended claims and the legal equivalents thereof.

What is claimed is:

1. A vehicle system, comprising:
   a transmission shifting means shiftable between a first position and a second position, the first position representing a start or stop mode, the transmission shifting means including a handle capable of being moved along a first axis, the first position including a first axial location on the first axis, and the second position including a second axial location on the first axis;
   a keyless start subsystem that detects an identification signal from an authorized electronic device present in a vehicle authorization zone and supplies an authorization signal indicating the identification signal has been verified;
   an engine adapted to turn on and to turn off; and
   a control system in operable communication with the transmission shifting means, the keyless start subsystem, and the engine, wherein:
   when the transmission shifting means is shifted to the first position, the transmission shifting means sends a first signal to the control system, the control system detects whether the authorization signal has been received from the keyless start subsystem, and if received, the control system provides a first command to the engine to turn on.

2. The vehicle system of claim 1, wherein:
   the second position comprises a stop mode, and
   when the engine is on and the transmission shifting means is shifted to the second position, the transmission shifting means sends a second signal to the control system, which provides a second command to the engine to turn off.

3. The vehicle system of claim 1, wherein the first position further comprises a stop position and the second position represents a park position.

4. The vehicle system of claim 1, wherein the first position further comprises a park position and the second position represents a stop mode.

5. The vehicle system of claim 1, wherein the first position further comprises a park position.

6. The vehicle system of claim 1, further comprising:
   a braking system including a brake pedal, the braking system in communication with the control system and capable of providing a signal to the control system indicating the brake pedal has been depressed,
   wherein, the control system provides the command to the engine to start after the control system receives the signal from the braking system that the brake pedal has been depressed.

7. The vehicle system of claim 1, further comprising:

a steering system including a locking mechanism, the steering system in communication with the control system and capable of providing a signal to the control system indicating whether the locking mechanism is locked or unlocked, wherein the control system provides the command to the engine to start after the control system receives the signal from the steering mechanism that the locking mechanism is unlocked.

8. A vehicle system, comprising:

a transmission shifting means shiftable between a first position and a second position, the first position representing a start or stop mode, the transmission shifting means including a handle capable of being moved along a first axis and a second axis intersecting the first axis, the first position including a first axial location on the second axis, the second position including a second axial location at an intersection of the first axis and the second axis;

a keyless start subsystem that detects an identification signal from an authorized electronic device present in a vehicle authorization zone and supplies an authorization signal indicating the identification signal has been verified;

an engine adapted to turn on and to turn off; and a control system in operable communication with the transmission shifting means, the keyless start subsystem, and the engine, wherein:

when the transmission shifting means is shifted to the first position, the transmission shifting means sends a first signal to the control system, the control system detects whether the authorization signal has been received from the keyless start subsystem, and if received, the control system provides a first command to the engine to turn on.

9. A vehicle system, comprising:

a handle capable of being moved along a first axis to shift between a first position and a second position, the first position representing a start mode, the first position including a first axial location on the first axis, and the second position including a second axial location on the first axis;

an authorization means adapted to detect an identification signal and to supply an authorization signal indicating the identification signal has been verified;

a steering system including a locking mechanism, the steering system in communication with the control system and capable of providing a signal to the control system indicating whether the locking mechanism is locked or unlocked;

an engine adapted to turn on and to turn off; and a control system in operable communication with the handle, the authorization means, the steering system, and the engine, wherein:

when the handle is shifted to the first position, the handle sends a first signal to the control system, the control system detects whether the authorization signal has been received from the authorization means and whether the signal from the steering mechanism has been received that the locking mechanism is unlocked and if received, the control system provides a first command to the engine to turn on.

10. The vehicle system of claim 9, wherein:

the second position comprises a stop mode, and when the handle is shifted to the second position and the engine is on, the handle sends a second signal to the control system, which provides a second command to the engine to turn off.

11. The vehicle system of claim 9, further comprising:

a braking system including a brake pedal, the braking system in communication with the control system and capable of providing a signal to the control system indicating the brake pedal has been depressed, wherein, the control system provides the command to the engine to start after the control system receives the signal from the braking system that the brake pedal has been depressed.

* * * * *